UNITED STATES PATENT OFFICE.

CARL MÜLLER, OF LUDWIGSHAFEN-ON-THE-RHINE, AND WILHELM STOBER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

BROWN SULFUR DYES.

1,165,531. Specification of Letters Patent. Patented Dec. 28, 1915.

No Drawing. Application filed April 15, 1914. Serial No. 832,054.

*To all whom it may concern:*

Be it known that we, CARL MÜLLER and WILHELM STOBER, citizens of the German Empire, residing, respectively, at Ludwigshafen-on-the-Rhine and Mannheim, Germany, have invented new and useful Improvements in Brown Sulfur Dyes, of which the following is a specification.

Our invention relates to a new class of brown sulfur dyes which we can obtain from acridin compounds, and in particular from the amino and the hydroxy derivatives of the acridins, by suitable treatment with sulfur and alkali sulfid, or with alkali polysulfid. Instead of employing the acridin compounds themselves the leuco compounds thereof can be used, and the use of such leuco compounds is equivalent to the use of the acridin derivatives themselves. The manufacture can, for instance, be carried out either by first heating the acridin body with an excess of sulfur and subsequently melting the resulting sulfur product with an alkaline sulfid, or the acridin body may be simultaneously treated with sulfur and alkaline sulfid with, or without, the addition of water, or alcohol. The first mentioned method appears to be preferable, more especially in the case of amino derivatives of acridin.

Our new coloring matters are characterized by being insoluble in water and in the ordinary organic solvents, but soluble in hot concentrated sulfuric acid with a brown color and in hot sodium sulfid solution with a brown color. They dye cotton from an alkaline sulfid solution very fast brown.

The following examples will serve to illustrate how this invention can be performed, but it is not confined to these examples. The parts are by weight.

Example 1: Heat one part of acridin yellow, which possesses a constitution corresponding to the formula:—

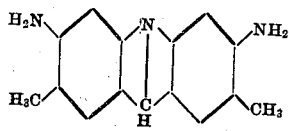

(2.7 - dimenthyl - 3.6 - diamino - acridin prepared from formaldehyde and meta-toluylene-diamin), or the leuco base thereof, with from three to four parts of sulfur in an iron stirring apparatus. Maintain the temperature at from 220-230° C. and stir until, from a test portion, it is seen that the melt does not contain any of the unchanged initial material, which is usually the case in about two or three hours. On cooling, break up the mass and add it to seven and a half parts of crystalline sodium sulfid heated to from 100-110° C. Then heat the melt to 170° C. and maintain it at this temperature till it can not longer be stirred, then raise the temperature to 270° C., when the mass again melts and then gradually solidifies. To work up the coloring matter dissolve the mass in water and precipitate the coloring matter by blowing in air. The coloring matter is a black powder which is soluble in hot sodium sulfid solution with a deep brown color, and this solution of the coloring matter dyes cotton bright brown of excellent fastness. It yields a reddish brown solution in hot caustic soda solution.

In a similar manner other amino-acridins such, for instance, as 3.6-tetramethyl-di-amino-acridin (acridin orange), 2.7-dimethyl - 3.6 - diamino - 9 - methyl - acridin (prepared from acetaldehyde and meta-toluylene-diamin) or the rheonin base, can be employed (see Schulz tables, 5th ed., 1912, Nos. 603 and 607).

Example 2: Stir one part of 2.7-dimethyl-3.6-dihydroxacridin, which possesses a constitution corresponding to the formula:—

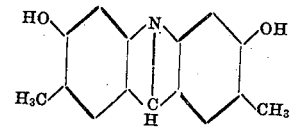

at a temperature of from 100-110° C. into a mixture of three parts of sulfur, seven and a half parts of crystalline sodium sulfid and three parts of water, and gradually raise the temperature to 230° C. until the melt solidifies. Then raise the temperature to 300° C. The mass first melts again; but this temperature being maintained the mass again solidifies. Then work up in the usual manner.

Coloring matter similar to the coloring matter prepared in the aforesaid ways can be obtained by melting (instead of the 2.7- dimethyl-3.6-dihydoxy-acridin), 3.6-dihydroxy-acridin (such as can be prepared from 3.6-diamino-acridin according to British Letters Patent No. 23,419, A. D. 1900, for 2.7-dimethyl-3.6-diamino acridin) with sulfur and sodium sulfid.

In the same way 2.7-dimethyl-3.6-dihydroxy-9-phenyl acridin (prepared from benzo-flavin), or 2.7-dimethyl-3.6-diamino-9-hydroxy-phenyl acridin, (prepared from m-hydroxy-benzaldehyde and meta-toluylene-diamin) can be used.

Now what we claim as:—

1. As new articles of manufacture the brown sulfur dyes which can be obtained from acridin compounds, which dyes are insoluble in water and in the ordinary organic solvents, but yield brown solutions in hot concentrated sulfuric acid and in hot sodium sulfid solution and dye cotton from the sodium sulfid solution brown shades of excellent fastness.

2. As new articles of manufacture the brown sulfur dye obtainable from 2.7-dimethyl-3.6-diamino-acridin, corresponding to the formula:—

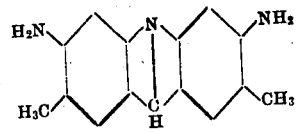

which new dye is insoluble in water and in the ordinary organic solvents, but yields brown solutions in hot concentrated sulfuric acid and in hot sodium sulfid solution, and a reddish brown solution in hot caustic soda solution and dyes cotton from the sodium sulfid solution brown shades of excellent fastness.

In testimony whereof we have hereunto set our hands in the presence of two subscribing witnesses.

CARL MÜLLER.
WILHELM STOBER.

Witnesses:
J. ALEC. LLOYD.
S. S. BERGER.